Aug. 6, 1929. H. E. SIPE 1,723,306
RESILIENT ATTACHING STRIP
Original Filed Aug. 2, 1927
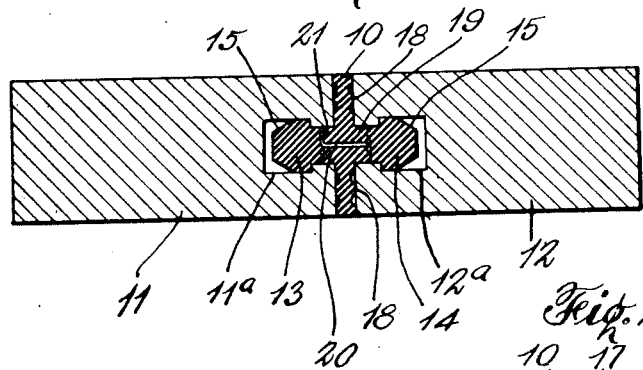
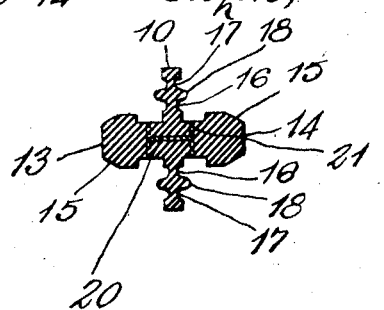
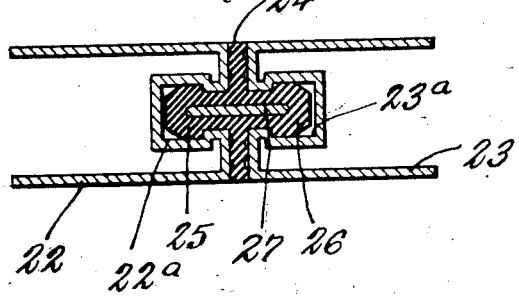
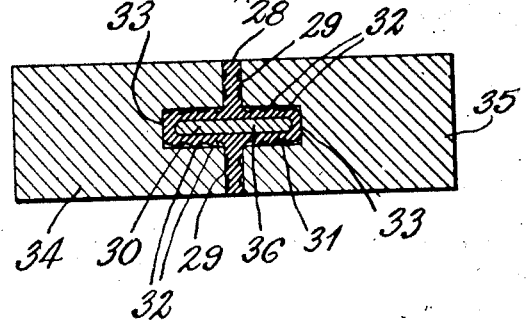
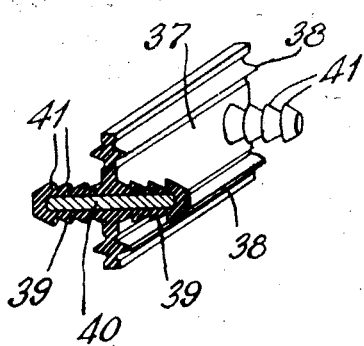
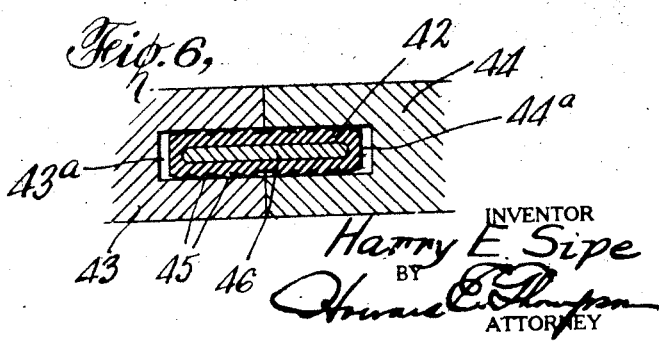
INVENTOR
Harry E. Sipe
BY
ATTORNEY Patented Aug. 6, 1929.

1,723,306

UNITED STATES PATENT OFFICE.

HARRY E. SIPE, OF NEW YORK, N. Y.

RESILIENT ATTACHING STRIP.

Application filed August 2, 1927, Serial No. 210,089. Renewed October 31, 1928.

This invention relates to strips employed for the purpose of attaching or coupling two or more rigid bodies together, such for example as wooden, metallic and similar bodies; and the object of the invention is to provide a strip composed of resilient material adapted to be arranged between the abutting or adjacent faces of two parts or members to be coupled together thereby, and means on said strip and said bodies or parts for coupling the same together, and to prevent the separation thereof; a further object being to provide means constituting part of said resilient coupling strip for retaining the bodies or parts coupled together thereby in proper alinement; a further object being to provide means for reinforcing the central portion of the strip or that part thereof disposed between the adjacent faces of the bodies or parts coupled together thereby; and with these and other objects in view, the invention consists in a device of the class and for the purpose specified, which is simple in construction, efficient in use and which is constructed as hereinafter described and claimed.

The invention is fully disclosed in the following specification, of which the accompanying drawing forms a part in which the separate parts of my improvement are designated by suitable reference characters in each of the views, and in which:—

Fig. 1 is a sectional, detail view of one form of construction which I employ, and indicating the method of its use.

Fig. 2 is a sectional, detail view of the strip shown in Fig. 1, detached.

Fig. 3 is a view similar to Fig. 1 but showing a modification.

Fig. 4 is a view similar to Figs. 1 and 3 but showing another modification.

Fig. 5 is a perspective, detail and sectional view of another modified form of strip; and, Fig. 6 is a view similar to Fig. 4 showing another modification.

In Figs. 1 and 2 of the drawing, I have shown at 10, one form of attaching or coupling strip which I employ in coupling two body parts or members 11 and 12 together. The body parts or members may be of any desired cross sectional form but constitute part of an apparatus or mechanism of any kind or class. The adjacent faces of said parts to be coupled together by my improved strip or coupling member 10 are provided with dove-tailed grooves or channels 11ª and 12ª opening outwardly through the adjacent edges of said parts. The side portions of the strip 10 are provided with dove-tailed flanges 13 and 14 adapted to enter and frictionally pass into the sockets or channels 11ª and 12ª. The outer ends of the flanges 13 and 14 are beveled as seen at 15 to facilitate the attachment of said parts, as will be apparent.

The side edges of the strip 10 are normally of the cross sectional form seen in Fig. 2 of the drawing; that is to say, are provided with inner and outer grooves 16 and 17 between which is formed a projecting rib 18, the grooves and ribs being arranged on both side faces of the strip 10. In coupling the parts 11 and 12 together, the ribs 18 are adapted to be compressed between the adjacent faces of said parts to place the parts under tension when coupled together as will be apparent. The web structure 19 which couples the dove-tailed flanges 12 and 14 with the strip 10 is provided with a reinforcing and keying member 20 consisting of a sheet metal or other rigid body having oppositely disposed flanges 21 spaced longitudinally of the side edge portions thereof, and extending at right angles thereto to engage the faces of the dove-tailed grooves or sockets 11ª and 12ª to key the parts 11 and 12 together and retain the same in proper alinement, especially when it is desirable to aline at least one face of said parts in coupling the same together.

The structure shown in Fig. 3 is identical with the structure shown in Figs. 1 and 2 except that parts 22 and 23 are coupled together by a strip 24 having dove-tailed flanges 25 and 26 entering dove-tailed sockets 22ª and 23ª in the parts 22 and 23. Instead of employing the reinforcing and keying member, 20, a reinforcing bar or plate 27 is employed and arranged longitudinally of the flanges and at right angles to the plane of the strip 24. The reinforcement 27 bridges the space between the parts 22 and 23 coupled by the coupling strip 24.

In Fig. 4 of the drawing, I have shown another modification wherein a strip 28, the side portions of which are provided with a rib structure 29 similar to the ribs 18, is provided with laterally extending flanges 30 and 31, the upper and lower faces of which are provided with longitudinally arranged and transversely spaced ribs 32 adapted to engage the upper and lower walls of sockets or channels 33 of two parts 34 and 35 to be coupled together by the strip 28. The ribs 32 are capable of flexing in the direction of the central portion of the strip 28 in coupling the parts 34 and 35 therewith, and placed under compression or tension so as to firmly engage the walls of the sockets 33 to prevent the separation of said parts. The ribs 29 are also placed under compression in this operation. In this construction, a reinforcing member 36 is also employed and extends longitudinally of the flanges 30 and 31.

In Fig. 5 of the drawing, I have shown at 37 another form of coupling strip, the opposite side portions of which having ribs 38 similar to the ribs 18 and 29, and instead of providing flanges extending longitudinally of the strip as in Fig. 4 of the drawing, I provide the side faces of the strip with longitudinally spaced and oppositely disposed studs 39 reinforced by pins 40 mounted therein, said studs having spaced projecting ribs or fins 41 adapted to flex in the same manner as the flexure of the ribs 32. In this construction, the parts coupled together by the strip 37 will have, on their adjacent faces, holes, into which the studs or dowels 39 are adapted to be placed. It will be understood that the diameter of the holes for receiving the studs 39 is less than the normal diameter of the rods 41. In the structure shown in Fig. 4, the transverse dimensions of the rib 32 is greater than the corresponding dimensions of the sockets 33.

With my improved coupling strip, it will be understood that two bodies or parts of any kind or class may be securely coupled together to prevent separation thereof, and yet a resilient, noiseless and flexible coupling is provided, and one which will compensate to a degree for the expansion and contraction of the parts coupled together thereby, thus presenting many practical uses of the invention. It will be understood that the body of rubber or composition rubber or other resilient material, interposed between the parts coupled together, may be varied in thickness to suit the specific uses thereof. It will also be understood that a suitable cement or adhesive may be employed in connection with the coupling and the parts coupled together thereby for adhering said parts.

In Fig. 6 of the drawing, I have shown another modification wherein a strip 42 of resilient material is arranged in the plane of the parts 43 and 44 to be coupled together, the strip 42 entering channels or grooves 43ª and 44ª in the adjacent faces of the parts 43 and 44, and the opposite side portions, as well as side faces of the strip 42, are provided with projecting fins or ribs 45 and 45ª, which are directed inwardly and adapted to engage the side walls of the channels 43ª and 44ª in coupling the parts 43 and 44 together. I also employ a reinforcing rigid body 46 which extends longitudinally of the strip into the side portions thereof. With this construction, the strip is not provided with a body intermediate the abutting faces of the parts 43 and 44, as in the other figures, but otherwise, the structure will operate in the same manner as the structure shown in Fig. 4 of the drawing, and a suitable seal or cement may be employed in connection with the strip in coupling the parts together.

While I have shown and described certain details of construction for carrying my invention into effect, it will be understood that I am not necessarily limited to these details, and various changes therein and modifications thereof may be made within the scope of the appended claims, without departing from the spirit of my invention or sacrificing its advantages.

Having fully described my invention, what I claim as new and desire to secure by Letters Patent, is:—

1. A coupling of the class described comprising an elongated strip of resilient material, and means disposed at the opposite sides of said strip in connection with which the members to be coupled together thereby are adapted to operate for coupling said members together, and means for reinforcing that part of the strip bridging said members.

2. A coupling of the class described comprising an elongated strip of resilient material, and means disposed at the opposite sides of said strip in connection with which the members to be coupled together thereby are adapted to operate for coupling said members together, means for reinforcing that part of the strip bridging said members, said strip being disposed between the adjacent faces of said members, and parts on said strip adapted to be compressed in coupling said members together.

3. A coupling strip of the class described comprising an elongated body of flexible material, and means at the opposite side portions of said body, whereby parts to be coupled may be secured thereto.

4. A coupling strip of the class described comprising an elongated body of flexible material, and means at the opposite side portions of said body, whereby parts to be coupled may be secured thereto, said means having portions adapted to tensionally engage said parts.

5. A coupling strip of the class described comprising an elongated body of flexible material, means at the opposite side portions of said body whereby parts to be coupled may be secured thereto, said means having portions adapted to tensionally engage said parts, and the side faces of said strip having surfaces adapted to be compressed in coupling said parts therewith, and means for reinforcing that portion of the strip bridging the parts coupled therewith.

6. A coupling strip of the class described comprising an elongated body of flexible material, means at the opposite side portions of said body whereby parts to be coupled may be secured thereto, said means having portions adapted to tensionally engage said parts, and the side faces of said strip having surfaces adapted to be compressed in coupling said parts therewith, and means for reinforcing that portion of the strip bridging the parts coupled therewith, and for keying said parts together.

7. A coupling strip of the class described comprising a body of rubber, coupling members disposed at the opposite sides of said strip, said coupling members having enlarged portions for engagement with the parts to be coupled to said strip and coupled together thereby.

8. A coupling strip of the class described comprising a body of rubber, coupling members disposed at the opposite sides of said strip, said coupling members having enlarged portions for engagement with the parts to be coupled to said strip and coupled together thereby, and said enlarged portions being free to flex in the direction of the body portion of said strip.

9. A coupling strip of the class described comprising a body of rubber, coupling members disposed at the opposite sides of said strip, said coupling members having enlarged portions for engagement with the parts to be coupled to said strip and coupled together thereby, said enlarged portions being free to flex in the direction of the body portion of said strip, and a reinforcing member mounted in the strip and extending into said members.

10. A coupling strip of the class described comprising a body of rubber, coupling members disposed at the opposite sides of said strip, said coupling members having enlarge portions for engagement with the parts to be coupled to said strip and coupled together thereby, said enlarged portions being free to flex in the direction of the body portion of said strip, a reinforcing member mounted in the strip and extending into said members, and compressible surfaces on said strip and adapted to be compressed by the parts coupled together by said strip.

11. The combination with two body parts adapted to be coupled together and provided on their adjacent faces with recesses, of a resilient coupling strip for resiliently coupling said parts together, said strip being disposed between the adjacent faces of said parts and provided with oppositely disposed members mounted in the recesses of said parts, and means on said members for retaining the same against displacement from said recesses in coupling said parts together.

12. The combination with two body parts adapted to be coupled together and provided on their adjacent faces with recesses, of a resilient coupling strip for resiliently coupling said parts together, said strip being disposed between the adjacent faces of said parts and provided with oppositely disposed members mounted in the recesses of said parts, means on said members for retaining the same against displacement from said recesses in coupling said parts together, and compressible bodies on said strip and between the adjacent faces of said parts.

13. The combination with two body parts adapted to be coupled together and provided on their adjacent faces with recesses, of a resilient coupling strip for resiliently coupling said parts together, said strip being disposed between the adjacent faces of said parts and provided with oppositely disposed members mounted in the recesses of said parts, means on said members for retaining the same against displacement from said recesses in coupling said parts together, and means comprising a rigid body in said strip for keying said parts together.

14. A resilient coupling strip of the class described, secured to one body part, and means projecting from one side of said strip adapted to engage another body part for coupling the same with said strip and said first named body part.

15. A resilient coupling strip of the class described secured to one body part, means projecting from one side of said strip adapted to engage another body part for coupling the same with said strip and said first named body part, and means for keying said body parts together.

16. A coupling strip of resilient material provided with irregularities on oppositely disposed faces thereof, said irregularities flexing in one direction in the attachment of the strip to a part to be coupled thereby, and retained against displacement from said part by the compression of said strip and irregularities on said part.

In testimony that I claim the foregoing as my invention I have signed my name this 22nd day of July, 1927.

HARRY E. SIPE.